(12) United States Patent
Hadjieleftheriou et al.

(10) Patent No.: US 8,112,802 B2
(45) Date of Patent: Feb. 7, 2012

(54) VERIFICATION OF OUTSOURCED DATA STREAMS

(75) Inventors: Marios Hadjieleftheriou, Madison, NJ (US); George Kollios, Cambridge, MA (US); Feifei Li, Tallahassee, FL (US); Divesh Srivastava, Summit, NJ (US); Ke Yi, Springfield, NJ (US); Graham Cormode, Morristown, NJ (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 582 days.

(21) Appl. No.: 12/275,879

(22) Filed: Nov. 21, 2008

(65) Prior Publication Data

US 2010/0132036 A1    May 27, 2010

(51) Int. Cl.
*G06F 11/00*    (2006.01)
(52) U.S. Cl. .......... 726/22; 707/687; 707/690; 707/691; 707/761
(58) Field of Classification Search .................... 726/22; 707/687, 690, 691, 761
See application file for complete search history.

(56) References Cited

U.S. PATENT DOCUMENTS 6,990,448 B2    1/2006    Charlesworth et al.

OTHER PUBLICATIONS

Yi et al., "Randomized Synopses for Query Assurance on Data Streams", May 2008., http://www.cs.fsu.eduh/~lifeifei/pirs/.*

S. Chandrasekaran, O. Cooper, A. Deshpande, M.J. Franklin, J.M. Hellerstein, W. Hong, S. Krishnamurthy, D. Madden, V. Raman, F. Reiss and M.A. Shah, "TelegraphCQ: Continuous Dataflow Processing for an Uncertain World," in Proc. of Biennial Conference on Innovative Data Systems Research (CIDR), 12 pages, 2003.
W.G. Aref, M.A. Hammad, M.F. Mokbel, M.H. Ali, A.C. Catlin, A.K. Elmagarmid, M. Eltabakh, M.G. Elfeky, T.M. Ghanem, R. Gwadera, I.F. Ilyas, M. Marzouk and X. Xiong, "Nile: A Query Processing Engine for Data Streams," in Proc. of International Conference on Data Engineering (ICDE), 2 pages, 2004.
A. Arasu, B. Babcock, S. Babu, M. Data, K. Ito, I. Nishizawa, J. Rosenstein and J. Widom, "STREAM: The Stanford Stream Data Manager," IEEE Data Engineering Bulletin, vol. 26, No. 1, 4 pages, 2003.
C. Cranor, T. Johnson, O. Spatscheck and V. Shkapenyuk, "Gigascope: A Stream Database for Internet Databases," in Proc. of ACM Management of Data (SIGMOD 2003), ACM, pp. 647-651, 2003.
D. Carney, U. Cetintemel, M. Cherniack, C. Convey, S. Lee, G. Seidman, M. Stonebraker, N. Tatbul and S. Zdonik, "Monitoring Streams—a New Class of Data Management Applications," in Proc. of the 28th Very Large Data Bases (VLDB Conference), pp. 215-226, 2003.

(Continued)

*Primary Examiner* — Vivek Srivastava
*Assistant Examiner* — Hee Song
(74) *Attorney, Agent, or Firm* — Hoffmann & Baron, LLP (57) ABSTRACT

Embodiments disclosed herein are directed to verifying query results of an untrusted server. A data owner outsources a data stream to the untrusted server, which is configured to respond to a query from a client with the query result, which is returned to the client. The data owner can maintain a vector associated with query results returned by the server and can generate a verification synopsis using the vector and a seed. The verification synopsis includes a polynomial, where coefficients of the polynomial are determined based on the seed. The data owner outputs the verification synopsis and the seed to a client for verification of the query results.

19 Claims, 3 Drawing Sheets

OTHER PUBLICATIONS

D. Abadi, Y. Ahmad, M. Balazinska, U. Cetinetemel, M. Cherniack, J. Hwang, W. Lindner, A. Maskey, A. Rasin, E. Ryvkina, N. Tatbul, Y. Xing and Zdonik, "The Design of the Borealis Stream Processing Engine," in Proc. of the 2005 CIDR Conference, 13 pages, 2005.

R. Sion, "Query Execution Assurance for Outsourced Databases," in Proc. of the 31st Very Large Data Bases (VLDB), pp. 601-612, 2005.

N. Tatbul, U. Cetintemel, S. Zdonik, M. Cherniack and M. Stonebraker, "Load Shedding in a Data Stream Manager," in Proc. of the 29th Very Large Data Bases (VLDB Conference), pp. 309-320, 2003.

R. Zhang, N. Koudas, B.C. Ooi and D. Srivastava, "Multiple Aggregations Over Data Streams," in Proc. of ACM Management of Data (SIGMOD) 2005, ACM, pp. 299-310, 2005.

S. Muthukrishnan, "Data Streams: Algorithms and Applications," 39 pages, 2003.

B. Babcock, S. Babu, M. Datar, R. Motwani and J. Widom, "Models and Issues in Data Stream Systems," in Proc. of ACM Symposium on Principles of Database Systems (PODS), 2002, ACM, 16 pages, 2002.

N. Alon, Y. Matias and M. Szegedy, "The Space Complexity of Approximating the Frequency Moments," in Proc. of ACM Symposium on Theory of Computing (STOC), 1996, ACM, pp. 20-29, 1996.

G. Cormode and S. Mthukrishnan, "An improved Data Stream Summary: the Count-Min Sketch and its Applications," Journal of Algorithms, vol. 55, No. 1, 18 pages, 2005.

P. Flajolet and G.N. Martin, "Probabilistic County Algorithms for Data Base Applications," Journal of Computer and System Sciences, vol. 31, No. 2, Academic Press, pp. 182-209, 1985.

K. Yi, F. Li, M. Hadjieleftherious, D. Srivastava and G. Kollios, "Randomized Synopses for Query Vertification on Data Streams," AT&T Labs Inc., Techn Rep., 2007, http://cs-people.bu.edu/lifeifei/papers/pirs.pdf, 10 pages.

R. Freivalds, "Fast Probabilistic Algorithms," in Proc. of International Symposium on Mathematical Foundations of Computer Science (MFCS), pp. 57-69, 1979.

Q. Zhao, J. Xu and Z. Liu, "Design of a Novel Statistics Counter Architecture with Optimal Space and Time Efficiency," ACM SIGMETRICS, pp. 323-334 (2006).

M. Thorup, "Even Strongly Universal Hashing is Pretty Fast," SODA, pp. 496-497 (2000).

M.N. Wegman and J.L. Carter, "New Hash Functions and Their Use in Authentication and Set Equality," Journal of Computer and System Sciences, Academic Press, Inc., vol. 22(3), pp. 265-279 (1981).

M. Datar, A. Gionis, P. Indyk and R. Motwani, "Maintaining Stream Statistics Over Sliding Windows," in Proc. of the Annual ACM-SIAM Symposium on Discrete Algorithms (SODA), Soc. for Industrial and Applied Mathematics, 20 pages, 2002.

N. Tatbul and S. Zdonik, "Window-aware Load Shedding for Aggregation Queries over Data Streams," VLDB, ACM, pp. 799-810 (2006).

C. Martel, G. Nuckolls, P. Devanbu, M. Gertz, A. Kwong, and S.G. Stubblebine, "A General Model for Authenticated Data Structures," Algorithmica, vol. 39(1), 19 pages (2001).

G.S. Manku and R. Motwani, "Approximate Frequency Counts Over Data Streams," in Proc. of the 28th Very Large Data Bases (VLDB Conference), pp. 346-357, 2002.

M. Bellare, O. Goldreich and S. Goldwasser, "Incremental Cryptography: The Case of Hashing and Signing," in Proc. of Advances in Cryptology (CRYPTO), Springer-Verlag, 19 pages, 1994.

H. Pang, A. Jain, K. Ramamritham and K-L Tan, "Verifying Completeness of Relational Query Results in Data Publishing," in Proc. of ACM Management of Data (SIGMOD), 2005, ACM, pp. 407-418 (2005).

H. Chan, A Perrig and D. Song, "Secure Hierarchical In-Network Aggregation in Sensor Networks," in Proc. of the ACM Conference on Computer and Communications Security (CCS), ACM, pp. 278-287 (10 pages), 2006.

M. Garofalakis, J.M. Hellerstein and P. Maniatis, "Proof Sketches: Verifiable In-Network Aggregation," in Proc. of International Conference on Data Engineering (ICDE), 10 pages, 2007.

F. Li, K. Yi, M. Hadjieleftheriou and G. Kollios, "Proof-Infused Streams: Enabling Authentication of Sliding Window Queries on Streams," in Proc. of Very Large Data Bases (VLDB) ACM, 12 pages, 2007.

S. Papadopoulos, Y. Yang and D. Papadias, "CADS: Continuous Authentication on Data Streams," in Proc. of Very Large Data Bases (VLD), ACM, 12 pages, 2007.

J.T. Schwartz, "Fast Probabilistic Algorithms for Verification of Polynomial Identifies," Journal of the ACM (JACM), vol. 27, No. 4, ACM, pp. 701-717, 1980.

A. Arasu and G.S. Manku, "Approximate Counts and Quantiles over Sliding Windows," PODS 2004, ACM, pp. 286-296 (2004).

B. Babcock, M. Datar and R. Motwani, "Load Shedding for Aggregation Queries Over Data Streams," ICDE, pp. 350-361 (12 pages), (2004).

B. Babcock, M. Datar, R. Motwani and L. O'Callaghan, "Maintaining Variance and k-Medians over Data Stream Windows," PODS 2003, ACM, pp. 234-243 (2003).

Z. Bar-Yossef, T.S. Jayram, R. Kumar, D. Sivakumar and L. Trevisan, "Counting distinct Elements in a Data Stream," Random, 10 pages (2002).

M. Bellare, R. Guerin and P. Rogaway, "XOR MACs: New Methods for Message Authentication Using Finite Pseudorandom Functions," CRYPTO 95 Proceedings, vol. 963, Springer-Verlag, pp. 21 pages (1995).

E. Bertino, B. Carminati, E. Ferrari, E. Thuraisingham and A. Gupta, "Selective and Authentic Third-Party Distribution of XML Documents," IEEE Trans. on Knowledge and Data Engineering, vol. 16, No. 10, IEEE, pp. 1263-1278 (2004).

G. Cormode and S. Muthurkrishnan, "What's Hot and What's Not: Tracking Most Frequent Items Dynamically," PODS 2003, ACM, pp. 296-306 (2003).

G. Cormode, S. Muthurkrishnan and I. Rozenbaum, "Summarizing and Mining Inverse Distributions on Data Streams via Dynamic Inverse Sampling," Proc. of the 31st VLDB Conference, pp. 25-36 (2005).

P. Devanbu, M. Gertz, C. Martel and S.G. Stubblebine, "Authentic Data Publication over the Internet," Journal of Computer Security, 22 pages.

S. Ganguly, M. Garofalakis and R. Rastogi, "Tracking Set-Expression Cardinalities over Continuous Update Streams," VLDBJ, vol. 13(4), Springer-Verlag, pp. 354-369 (2004).

A. Metwally, D. Agrawal and A.E. Abbadi, "An Integrated Efficient Solution for Computing Frequent and Top-k Elements in Data Streams," ACM Trans. on Database Sys., vol. 31(3), ACM, pp. 1095-1133 (2006).

A.C. Gilbert, Y. Kotidis, S. Muthukrishnan and M.J. Strauss, "How to Summarize the Universe: Dynamic Maintenance of Quantiles," Proc. of the 28th VLDB Conference, pp. 454-465 (2002).

M. Greenwald and S. Khanna, "Space-Efficient Online Computation of Quantile Summaries," SIGMOD, pp. 58-66 (2001).

H. Hacigumus, B. Iyer and S. Mehrotra, "Providing Database as a Service," ICDE, 10 pages (2002).

P. Indyk and D. Woodruff, "Optimal Approximations of the Frequency Moments of Data Streams," STOC '05, ACM, 8 pages (2005).

R.M. Karp, S. Shenker and C.H. Papadimitriou, "A Simple Algorithm for Finding Frequent Elements in Streams and Bags," ACM Trans. on Database Systems, vol. 28(1), ACM, pp. 51-55 (2003).

F. Li, Q. Chang, G. Kollios and A. Bestavros, "Characterizing and Exploiting Reference Locality in Data Stream Applications," ICDE, 12 pages (2006).

F. Li, M. Hadjieleftheriou, G. Kollios and L. Reyzin, "Dynamic Authenticated Index Structures for Outsourced Databases," SIGMOD 2006, ACM, pp. 121-132 (2006).

H. Pang and K.-L. Tan, "Authenticating Query Results in Edge Computing," Proc. of the 20th ICDE, pp. 560-571 (2004).

* cited by examiner

VERIFICATION OF OUTSOURCED DATA STREAMS

BACKGROUND OF THE INVENTION

1. Field of the Invention

The present invention is directed to query verification of untrusted servers, and more specifically to a query verifier that uses a synopsis to verify query results.

2. Brief Discussion of Related Art

Due to the overwhelming flow of information in many data stream applications, data outsourcing is a natural and effective paradigm for individual businesses to address the issue of scale. In conventional data outsourcing models, the data owner outsources streaming data to one or more third-party servers, which answer queries posed by a potentially large number of clients on the data owner's behalf. Data outsourcing intrinsically raises issues of trust. Conventional approaches to query verification build upon cryptographic primitives, such as signatures and collision-resistant hash functions, which typically only work for certain types of queries, such as simple selection/aggregation queries.

Conventional industrial and academic Data Stream Management Systems (DSMS) have been developed in recent years. The need for such DSMSs is mainly driven by the continuous nature of the data being generated by a variety of real-world applications, such as telephony and networking. Providing fast and reliable querying services on the streaming data to clients is central to many businesses. However, due to the overwhelming data flow observed in most data streams, companies typically do not possess the necessary resources for deploying a DSMS. In these cases, outsourcing the data stream and the desired computations to a third-party server can be the only alternative. Outsourcing also solves the issue of scale. That is, as the number of clients increases, the number of mirroring servers employed by the data owner can be increased. In addition, this can often lead to faster query responses, since these servers can be closer to the clients than a single centralized server. However, because data outsourcing and remote computations raise issues of trust, outsourced query verification on data streams is a problem with important practical implications.

For example, a data owner with limited resources, such as memory and bandwidth, may outsource its data stream to one or more remote, untrusted servers that can be compromised, malicious, running faulty software, etc. A client registers a continuous query on the DSMS of the server and receives results upon request. Assuming that the server charges the data owner according to the computation resources consumed and the volume of traffic processed for answering the queries, the server then has an incentive to deceive the owner and the client for increased profit. Furthermore, the server might have a competing interest to provide fraudulent answers to a particular client. Hence, a passive malicious server could drop query results or provide random answers in order to reduce the computation resources required for answering queries, while a compromised or active malicious server might be willing to spend additional computational resources to provide fraudulent results (by altering, dropping, or introducing spurious answers). In other cases, incorrect answers might simply be a result of faulty software, or due to load shedding strategies, which are essential tools for dealing with bursty streaming data.

Ideally, the data owner and the client should be able to verify the integrity of the computation performed by the server using significantly fewer resources than having the query answered directly, i.e., where the data owner evaluates the query locally and then transmits the entire query result to the client. If a client wants to verify the query results with absolute confidence, the only solution is for the data owner to evaluate the query exactly and transmit the entire result to the client, which obviates the need of outsourcing.

Further, the client should have the capability to tolerate errors caused by load shedding algorithms or other non-malicious operations, while at the same time being able to identify mal-intended attacks which have a significant impact on the result.

SUMMARY OF THE INVENTION

Embodiments of the present invention are directed to a method, medium, a computing system for verifying a query result of an untrusted server. A data stream is outsourced to the untrusted server, which is configured to respond to a query with the query result. A verification synopsis is generated using at least a portion of the query result and a seed, which in some embodiments can uses at most 3 words of memory. The verification synopsis includes a polynomial, where coefficients of the polynomial are determined based on the seed. The verification synopsis and the seed are output to a client for verification of the query result. Verification of the query result can be performed in a single pass of the query result. A result synopsis can be computed using the query result and the result synopsis is compared with the verification synopsis to verify the query result.

In some embodiments, the seed can be required by the client to use the verification synopsis and can have a value that is undisclosed by the data owner until the seed is output to the client. An alarm can be raised when the verification synopsis and the query results do not match and/or the number of errors between the verification synopsis and the query results exceeds a threshold. In some embodiments, errors in the query result can be located and corrected using the verification synopsis and/or the number of errors in the query result can be estimated using the verification synopsis.

In some embodiments, a vector can be maintained corresponding to the query result and the verification synopsis can be computed using the vector when a request for verification is received.

In some embodiments, layers can be generated, where each layer includes buckets. One of the buckets can be represented by the verification synopsis and elements of the vector are assigned to one bucket per layer.

Other objects and features of the present invention will become apparent from the following detailed description considered in conjunction with the accompanying drawings. It is to be understood, however, that the drawings are designed as an illustration only and not as a definition of the limits of the invention.

DETAILED DESCRIPTION

Exemplary embodiments of the present invention are illustrated using "GROUP BY, COUNT" and "GROUP BY, SUM" queries known to those skilled in the art, although it will be recognized that other queries can be used. In network monitoring applications, a computation of the total number of packets originated and destined to certain IP addresses is often desired. The "GROUP BY, COUNT" query is substantially equivalent to computing the frequencies (e.g., occurrences) of tuples in a stream. Most streaming algorithms deal with either the frequencies directly or their relatives, such as frequency moments, heavy hitters, quantiles, and inverse frequencies, which focus on computing the answers to these queries, but not their verification.

Embodiments of the present invention include a query verifier that uses algebraic and probabilistic techniques to compute a small synopsis on the true query result, which can be communicated to the client for verification of whether the query result returned by the server are correct. A synopsis is a small summary based on a query result that is maintained and updated by the data owner and includes a polynomial with coefficients that are based on query results and a random seed. As used herein, a "verification synopsis refers to a synopsis generated by the data owner using a vector based on query results and a "result synopsis" refers to a synopsis generated by a client using query results. A polynomial is a mathematical expression having constants and variables forming terms, each term consisting of a constant multiplier and one or more terms raised to a power, where the terms are separated by mathematical operations. A seed is a random number defined by the data owner that is required to perform the verification of query results using the synopsis. Embodiments of the present invention advantageously provide high-confidence probabilistic solutions with arbitrarily minuscule probability of error, and develop verification algorithms that incur minimal resources, in terms of both the memory consumption of the data owner and the data owner-client network bandwidth.

Figure 1:
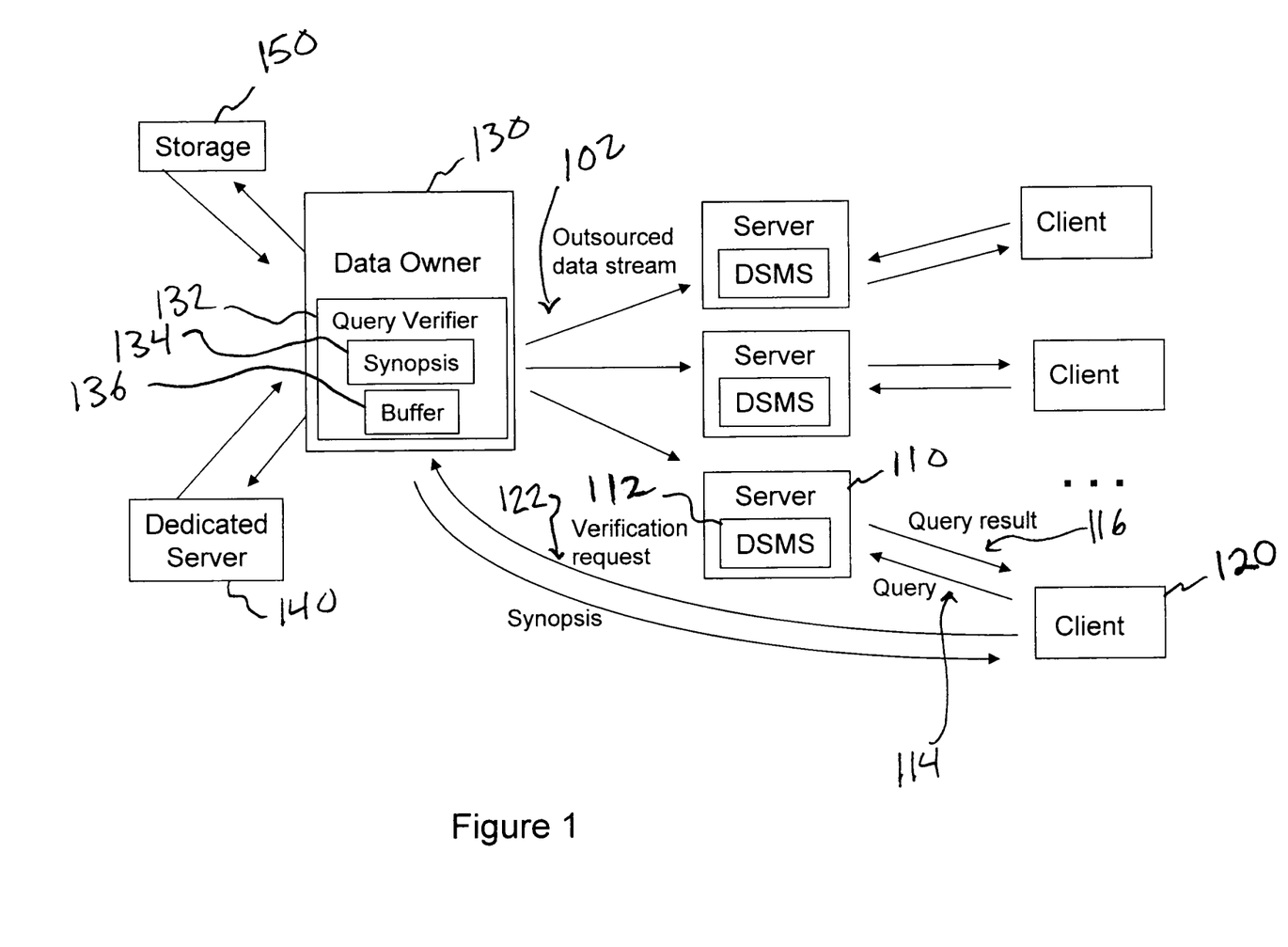
FIG. 1 shows an exemplary data outsourcing architecture 100.

FIG. 1 is an exemplary data outsourcing architecture 100, in which an untrusted server 110 maintains and makes available, to at least one client 120, outsourced data steams 102 associated with a data owner 130. Outsourcing refers to sending information to an independent third party such that the third party performs the operations typically performed by the data owner. The untrusted server, client, and data owner can be computing devices, the implementation of which is known to those skilled in the art. The untrusted server 110 is a server that operates independent of the data owner 130 as a third party to provide clients 120 of the data owner 130 with query results. A query result is a response from the untrusted server to a query that includes information requested by a client. As a result neither the client 120 nor the data owner 130 can be certain that the query results are valid. The untrusted server 110 can implement a Data Stream Management System (DSMS) 112, which stores and manages data stream information provided by a data owner and retrieves the information in response to queries. A data stream is continuous flow of discrete pieces of information from one computing device to another computing device. The data stream can have a beginning and an end, where all information sent between the beginning and the end are considered to be part of the data stream. The client 120 can register a query 114 with the untrusted server 110 and can receive query results 116 when requested. The data owner generally does not have control of the query results provided by the untrusted server 110. In some embodiments, the data owner can also act as the client. In these embodiments, the data owner typically does not have enough processing power and resources to run a DSMS itself, but has enough resources to compute the verification synopses instead.

To ensure that the untrusted server 110 is providing valid results, the data owner 130 includes a query verifier 132, which generates and maintains a randomized synopsis 134 of the query results. The query verifier 132 generates the randomized synopsis 134, which is referred to herein as a "polynomial identity random synopsis" (PIRS), to raise an alarm with very high confidence if errors in the query results 116 exist. Specifically, the data owner 130 preferably maintains the synopsis 134 at a constant size of three machine words (e.g., 3 bytes), and transmits the synopsis 134 to the client 120 preferably via a secure channel upon a verification request 122. The query result 116 can be verified using this small synopsis 134. The synopsis 134 can be maintained using constant space and low processing cost per tuple in the stream (O(1) for count queries and O(log n) or O(log μ) for sum queries, where n is the number of possible groups and μ is the update amount per tuple, and O denotes an asymptotic upper bound. In some embodiments, the synopsis 134 can be used for verifying multiple simultaneous queries with the same aggregate attribute but different group-by partitioning, where the size of the synopsis 134 is the same as that for verifying a single query.

In some embodiments, the query verifier 132 can implement a buffer 136 for data streams that exhibit a large degree of locality. The buffer 136 can be used to store exact aggregate results for a small number of groups. With data locality, a large portion of updates hit the buffer 136. Whenever the buffer 136 is full and a new group needs to be inserted, a victim is evicted from the buffer using a simple least recently used (LRU) policy. Only then does the evicted group update PIRS, using the overall aggregate value computed within the buffer 136. The buffer 136 is emptied to update PIRS whenever verification is required.

Embodiments of the query verifier 132 can use generalizations of the synopsis 134, using the basic PIRS as a building block to create different verification schemes. In some embodiments, a generalization of PIRS is generated for raising alarms when a number of errors exceed a predefined threshold $\gamma$. This synopsis, referred to herein as PIRS$^\gamma$, allows the server 110 to return query results having a predefined margin of error, which can result from, for example, using semantic load shedding. When the number of errors is less than the predefined threshold $\gamma$, the server is still considered to be trustworthy.

In some embodiments, a weaker version of PIRS$^\gamma$, referred to herein as PIRS$^{\pm\gamma}$, can be generated for allowing the server 110 to return query results having an approximate predefined margin of error, where if the errors are fewer than $\gamma^-$ the answer is considered valid, while if the errors are more than $\gamma^+$ the answer is considered invalid.

In some embodiments, a strengthened version of PIRS$^\gamma$, referred to herein as PIRS$^{\gamma*}$, can be generated so that when the number of errors is tolerable, the errors can be located and even corrected. When PIRS$^{\gamma*}$ is implemented, it can also act as an error-correcting code, which can guarantee that the complete and correct query results can be delivered to the client 120 when the number of errors is less than the predefined threshold $\gamma$.

In some embodiments, an embodiment of the synopsis 134, referred to herein as FM-PIRS, can be used to estimate the actual number of errors accurately. FM-PIRS is a parameter-free version of PIRS$^{\pm\gamma}$ in the sense that it does not depend on the predefined threshold $\gamma$. In particular, when the number of errors exceeds the predefined threshold $\gamma$, PIRS$^{\pm\gamma}$ raises an alarm, while FM-PIRS also reports an estimate of the actual number of errors. FM-PIRS has a smaller size than PIRS$^{\pm\gamma}$ for large enough threshold $\gamma$.

Exemplary queries used to illustrate the query verifier 132 can have the following structure:

SELECT AGG(A_1), ..., AGG(A_N) FROM T
WHERE ... GROUP BY G_1, ..., G_M

GROUP BY aggregate queries can have wide applications in monitoring and statistical analysis of data streams (e.g., in networking and telephony applications). An example of such a query that appears frequently in network monitoring applications is the following:

SELECT SUM(packet_size) FROM IP_Trace
GROUP BY source_ip, destination_ip (*)

The above query (*) is used for illustrating exemplary embodiments, where sum and count are used, and is referred to herein as the "illustrative query". Other aggregates that can be converted to sum and count, such as average, standard deviation, and the like, can be supported, by verifying each component separately (i.e., verifying the sum and the count in the case of average).

The "GROUP BY" predicate partitions streaming tuples into a set of n groups, computing one sum per group. The data stream can be viewed as a sequence of additions (or subtractions) over a set of items in $[n]=\{1, \ldots, n\}$). This data stream S and its $\tau$-th tuple is denoted herein as $s^\tau = (i, u^\tau)$, an update of amount $u^\tau$ to the ith group. The query answer can be expressed as a dynamic vector of non-negative integers $v^\tau = |v_1^\tau, \ldots, v_n^\tau| \in \mathbb{N}^n$, containing one component per group aggregate. Initially, $v^0$ is the zero vector. A new tuple $s^\tau = (i, u^\tau)$ updates the corresponding group i in $v^\tau$ as $v_i^\tau = v_i^{\tau-1} + u^\tau$. The amount $u^\tau$ can either be positive or negative, but require $v_i^\tau \geq 0$ for all $\tau$ and i. When count queries are concerned, $u^\tau$ is substantially equal to 1 for all $\tau$. An assumption can be made that the $L_1$ norm of $v^\tau$ is always bounded by some large m, i.e., at any $$\tau, \|v^\tau\|_1 = \sum_{i=1}^{n} v_i^\tau \leq m,$$

The following definition captures the semantics of Continuous Query Verification (CQV):

Formal Definition 1. Given a data stream S, a continuous query Q and a user defined parameter $$\delta \in \left(0, \frac{1}{2}\right),$$

a synopsis X of vector v is designed such that for any $\tau$, given any $w^\tau$ and using $X(v^\tau)$, an alarm is raised with probability at least $1-\delta$ if $w^\tau \neq v^\tau$ and an alarm is not raised if $w^\tau = v^\tau$.

In some embodiments $w^\tau$ can be, for example, an answer provided by the server 110, while $X(v^\tau)$ can be the synopsis 134 communicated to the client 120 from the data owner 130 for verifying vector $v^\tau$.

Using the above definition, an alarm can be raised with high probability if any component (or group answer) $v_i^\tau$ is inconsistent. As an example, consider a server that is using semantic load shedding, i.e., dropping tuples from certain groups, on bursty stream updates. In this example, the aggregate of a certain, small number of components will be inconsistent without malicious intent. In some embodiments, a certain degree of tolerance in the number of erroneous answers contained in the query results is allowed, rather than raising alarms indistinctly. The following definition captures the semantics of *Continuous Query Verification with Tolerance for a Limited Number of Errors* ($CQV^\gamma$):

Formal Definition 2. For any w, $v \in \mathbb{N}^n$, let $E(w, v) = \{i | w_i \neq v_i\}$. Then define $w \neq_\gamma v$ if and only if $|E(w, v)| \geq \gamma$ and $w =_\gamma v$ if and only if $|E(w, v)| < \gamma$. Given a data stream S, a continuous query Q, and user defined parameters $$\gamma \in \{1, \ldots, n\} \text{ and } \delta \in \left(0, \frac{1}{2}\right),$$

a synopsis X of vector v is designed such that, for any $\tau$, given any $w^\tau$ and using $X(v^\tau)$, an alarm is raised with probability at least $1-\delta$, if $w^\tau \neq_\gamma v^\tau$; and an alarm is not raised if $w^\tau =_\gamma v^\tau$.

Formal definition 1 is a special case of formal definition 2, where the threshold $\gamma = 1$.

Some embodiments can support random load shedding (i.e., can tolerate small absolute or relative errors on any component irrespective of the total number of inconsistent components. The following definition captures the semantics of Continuous Query Verification with Tolerance for Small Errors ($CQV^\eta$).

Formal Definition 3. For any w, $v \in \mathbb{N}^n$, let $w \approx_\eta v$ if and only if there is some i such that $|w_i - v_i| > \eta$, and $w \approx \eta v$ if $|w_i - v_i| \leq \eta$ for all $i \in [n]$. Given a data stream S, a continuous query Q, and user defined parameters $\eta$ and $$\delta \in \left(0, \frac{1}{2}\right),$$

a synopsis Z of vector v can be designed such that, for any $\tau$, given any $w^\tau$ and using $X(v^\tau)$, an alarm is raised with probability at least $1-\delta$, if $w^\tau \approx_\eta v^\tau$; and an alarm is not raised if $w^\tau \approx_\eta v^\tau$.

The formal definition 3 requires the absolute errors for each $v_i^\tau$ to be no larger than $\eta$. It is also possible to use relative errors (i.e., raise an alarm if and only if there is some i such that $|w_i^\tau - v_i^\tau|/|v_i^\tau| > \eta$). Thus, formal definition 1 is also a special case of formal definition 3 with $\eta = 0$.

Those skilled in the art will recognize that further variations and cases can also be defined. For example, one may wish to bound the sum of the absolute errors, or bound both the number and the size of the errors. Under a standard RAM model, used for illustrative purposes, it is assumed that addition, subtraction, multiplication, division, or modular arithmetic operations involving two words take one unit of time. It is also assumed that $n/\delta$ and $m/\delta$ fit in a word.

Embodiments of the Polynomial Identity Random-Synopsis (PIRS) can be denoted by $X(v)$. The synopsis 134 is based on testing the identity of polynomials by evaluating the polynomials at a randomly chosen point. The technique of verifying polynomial identities is well-known to those skilled in the art. PIRS can have two variants, named PIRS-1 and PIRS-2, respectively.

For PIRS-1, let p be some prime such that $\max\{m/\delta, n\} < p$. For the space analysis, let $p \leq 2 \max\{m/\delta, n\}$. For PIRS-1, the field $\mathbb{Z}_p$ is used, where additions, subtractions, and multiplications are done modulo p. For the first PIRS, denoted PIRS-1, a seed $\alpha$ is chosen from $\mathbb{Z}_p$ uniformly at random and $X(v)$ is computed incrementally from $X(v^{\tau-1})$ and $s^\tau = (i, u^\tau)$ as:

$$X(v^\tau) = X(v^{\tau-1})(\alpha-i)^{u^\tau} X(0) = X(v^0) = 1 \quad (1)$$

$$X(v) = (\alpha-1)^{v_1} \cdot (\alpha-2)^{v_2} \ldots (\alpha-n)^{v_n}. \quad (2)$$

The values of n, m, $\delta$, p are known to the data owner 130 and the clients 120. The data owner 130 secretly picks a seed α and maintains X(v). Upon a verification request 122, the data owner 130 returns the synopsis 134 (e.g., PIRS) to the client 120, which can include only two words: seed α and X(v). Given any answer w (i.e., query results 116) returned by the server 110, the client 120 can use PIRS to check if w=v with high probability, by computing $$X(w)=(\alpha-1)^{w_1} \cdot (\alpha-2)^{w_2} \cdot \ldots (\alpha-n)^{w_n}. \quad (3)$$

If $$\sum_{i=1}^{n} w_i > m,$$

the answer w is rejected immediately as being erroneous. If X(w)=X(v), then it is declared that w=v. Otherwise, an alarm is raised. Using this approach, a false alarm is never raised, and it can be shown a true alarm will be missed with a probability at most δ. Given any w≠v, PIRS raises an alarm with probability at least 1−δ. To illustrate this, consider polynomials $f_v(x)=(x-1)^{v_1}(x-2)^{v_2} \ldots (x-n)^{v_n}$ and $f_w(x)=(x-1)^{w_1}(x-2)^{w_2} \ldots (x-n)^{w_n}$. Since a polynomial with 1 as its leading coefficient (i.e., the coefficient of the term with the largest degree) is completely determined by its zeroes (with multiplicities), $f_v(x) \equiv f_w(x)$ if and only if v=w. Since both $f_v(x)$ and $f_w(x)$ have degree at most m, $f_v(x)=f_w(x)$ happens at no more than m values of x if v≠w, due to the fundamental theorem of algebra. Since we have p≧m/δ choices for seed α, the probability that X(v)=X(w) happens is at most δ over the random choice of seed α.

The update time to maintain X(v) as new updates are observed can be determined as follows. For count queries, each tuple increments one of the $v_i$'s by one, so the update cost is constant (one subtraction and one multiplication). For sum queries, a tuple s=(i, u) increases $v_i$ by u, so $(\alpha-i)^u$ is computed, which can be done in O(log u) (exponentiation by repeated squaring) time. To perform a verification with the answer w, $(x-i)^{w_i}$ is computed for each nonzero entry $w_i$ of the answer w, which takes $O(\log w_i)$ time, so the time needed for a verification is $$O\left(\sum \log w_i\right) = O\left(|w| \log \frac{m}{|w|}\right).$$

Since both X(v) and seed α are smaller than p, the space complexity of the synopsis is $$O\left(\log \frac{m}{\delta} + \log n\right)$$

bits.

PIRS-1 occupies $$O\left(\log \frac{m}{\delta} + \log n\right)$$

bits of space, spends O(1) (resp. O(log u)) time to process a tuple for count queries, and $$O\left(|w| \log \frac{m}{|w|}\right)$$

time to perform a verification.

When u is negative (or when handling deletions for count queries), the field $\mathbb{Z}_p$ may not be equipped with division. In this case, $(\alpha-i)^{\mathbb{Z}_p}$ is computed, which is the multiplicative inverse of (α−i) in $\mathbb{Z}_p$, in O(log p) time, and then compute $(\alpha-i)^{-1 \cdot |u|}$.

For PIRS-2, space usage can be improved using PIRS-2 when n≪m, in which the prime p is chosen between max {m, n/δ} and 2 max {m, n/δ}. For a seed α chosen uniformly at random from $\mathbb{Z}_p$, the following can be computed.

$$X(v)=v_1\alpha+v_2\alpha^2+\ldots+v_n\alpha^n.$$

By adding on $u\alpha^i$ in response to update s=(i, u), the above synopsis is straightforward to maintain over a stream of updates. PIRS-2 has an O(log n) update cost for both count and sum queries, since $u\alpha^i$ is computed for a tuple (i, u) in the stream. PIRS-2 occupies $$O\left(\log m + \log \frac{n}{\delta}\right)$$

bits of space, spends O(log n) time to process a tuple, and O(|w|log n) time to perform a verification.

One property of either variant of PIRS (e.g., PIRS-1 or PIRS-2) is that the verification can be performed in one pass of the answer w using a constant number of words of memory. This is advantageous when |w| is large. The client 120 can receive the answer w in a streaming fashion, verify it online, and either forward it to a dedicated server 140 (FIG. 1) for further processing, or a network storage device 150 (FIG. 1) for offline use.

Embodiments of the synopses solving the CQV problem with error probability of at most δ keep $$\Omega\left(\log \frac{\min\{m, n\}}{\delta}\right)$$

bits. To illustrate this, assume that the vector v and the answer w are both taken from a universe U, and let M be the set of all possible memory states the synopsis can have. Any synopsis X can be seen as a function $f:U \to M$; and if X is randomized, it can be seen as a function randomly chosen from a family of such functions $F=\{f_1, f_2, \ldots, f_l\}$, where $f_i$ is chosen with probability $p(f_i)$. Without loss of generality, assume that $p(f_1) \geq p(f_2) \geq \ldots \geq p(f_l)$. The synopsis X needs at least log |M| bits to record the output of the function and log |F| bits to describe the function chosen randomly from F.

For any w≠v∈u, let $F_{w,v}=\{f \in F | f(w)=f(v)\}$. For a randomized synopsis X to solve CQV with error probability at most δ, the following must hold for all w≠v∈u:

$$\sum_{f \in \mathcal{F}_{w,v}} p(f) \leq \delta. \quad (5)$$

Focusing on the first $k=\lceil \delta|F| \rceil+1$ functions $f_1, \ldots, f_k$, it can be seen that $$\sum_{i=1}^{k} p(f_i) > \delta.$$

Since there are a total of $|M|^k$ possible combinations for the outputs of these k functions $$|u| \leq |M|^k \quad (6)$$

so that no two $w \neq v \in u$ have $f_i(w) = f_i(v)$ for all $i = 1, \ldots, k$; otherwise an answer w and a vector v can be found that violate equation (5). Taking the log of both sides of equation (6), the following results $$\log |u| \leq (\lceil \delta \cdot |F| \rceil + 1) \log |M|. \quad (7)$$

Since vector v has n entries whose sum is at most m, by simple combinatorics, $$|\mathcal{U}| \geq \binom{m+n}{n},$$

or $\log|u| \geq \min\{m, n\}$. The following tradeoff can therefore be obtained.

$$|F| \cdot \log|M| = \Omega(\min\{m,n\}/\delta). \quad (8)$$

If $\log \cdot |F| \leq (1-\epsilon) \log(\min\{m, n\}/\delta)$ (i.e., $|F| \leq (\min\{m, n\}/\delta)^{1-\epsilon}$) for any constant $\epsilon \in (0, 1)$, then X uses super-polylogarithmic space $\log |M| = \Omega((\min\{m, n\}/\delta)^{\epsilon})$; else X keeps $\log|F| \geq \log(\min\{m, n\})\delta)$ random bits. Therefore, when $m \leq n$, PIRS-1 is optimal as long as $$\log n = O\left(\log \frac{m}{\delta}\right);$$

and when m>n, PIRS-2 is optimal as long as $$\log m = O\left(\log \frac{n}{\delta}\right).$$

The bounds are not tight when $$\log \frac{m}{\delta} = o(\log n)$$

or $$\log \frac{n}{\delta} = o(\log m).$$

The analysis above focuses on bit-level space complexity. The value of p is chosen to be the maximum prime that fits in a word, so as to minimize $\delta$, where $\delta = m/p$ for PIRS-1 and $\delta = n/p$ for PIRS-2. For example, if 64-bit words are used and $m < 2^{32}$, then $\delta$ is at most $2^{-32}$ for PIRS-1, which makes any error highly unlikely (e.g., 1 in four billion). For speed consideration, careful choice of p can allow faster implementation. For example, choosing p to be a Mersenne prime (e.g., p is of the form $p = 2^l - 1$ for some l) allows the modulo arithmetic to be performed using simple addition and subtraction operations.

Since the group id i is extracted from each incoming tuple directly, without the use of a dictionary (which would increase the memory cost), the size of the group space, n, needs to be large for certain queries. For example, the exemplary query discussed above has a group space of $n = 2^{64}$ (the combination of two IP addresses), although the actual number of nonzero entries |v| may be much less than n. In this case, since m is typically much smaller, PIRS-1 is the better choice in this example.

Embodiments of the present invention can be used for handling multiple queries simultaneously. For example, consider a number of aggregate queries on a single attribute (e.g., packet size), but with different partitioning on the input tuples (e.g., source/destination IP and source/destination port). Let $Q_1, \ldots, Q_k$ be k such queries, and let the i-th query partition the incoming tuples into $n_i$ groups for a total of $$\sum_{i=1}^{k} n_i$$

groups. In some embodiments, PIRS can be applied once per query, using space linear in k. In other embodiments, the queries can be treated as one unified query of n groups so that one PIRS is used to verify the combined vector v. The time cost for processing one update increases linearly in k, since each incoming tuple is updating k components of vector v at once (one group for every query in the worst case):

Using PIRS-1 for k queries can occupy $$O\left(\log \frac{m}{\delta} + \log n\right)$$

bits of space, spend $O(k)$ (resp. $O(k \log u)$) time to process a tuple for count (sum) queries, and $$O\left(|w| \log \frac{m}{|w|}\right)$$

time to perform a verification. As a result, multiple queries can be effectively verified with a few words of memory and communication.

After an error has been detected, the client 120 can choose to disclose this information to the server 110. If the error is not reported, then the probability of detecting an error remains $1-\delta$. However, errors can occur due to faulty software or bad communication links, and may not be intentional. In this case, it can be beneficial to give a warning to the server 110. Since an adversary can extract knowledge from this warning (e.g., it knows at least that the same response on the same data will always fail), the guarantee of detecting an error with the probability of $1-\delta$ does not strictly hold. In order to restore the $1-\delta$ success rate after a reported attack, the synopsis 134 has to be recomputed from scratch, which is not typically possible in a streaming setting. Hence, it can be important to rigorously quantify the loss of guarantee after a series of warnings have been sent out without resetting the synopsis.

To achieve this let $e_k = 1$ if the k-th attack goes undetected and $e_k = 0$ otherwise. Let $p_k$ be the probability that the server succeeds in its k-th attack after k-1 failed attempts, (i.e., $p_k = \Pr[e_k = 1 | e_1 = 0, \ldots, e_{k-1} = 0]$). Therefore, it can be determined that $p_1 \leq \delta$. To demonstrate the strength of one embodiment of the present invention, $p_k$ is bounded by an upper limit with respect to the most powerful server A. It can be assumed that the server A knows how PIRS works except its random seed, $\alpha$; maximally explores the knowledge that could be gained from one failed attack; and possesses unbounded computational power.

The best server A could do to improve $p_k$ over multiple attacks is quantified. The space of seeds used by PIRS is denoted R. For any answer w and vector v, the set of witnesses is denoted as $W(w, v) = \{r \in \mathcal{R} | \text{PIRS raises an alarm on } r\}$ and the set of non-witnesses is denoted as $\overline{W}(w, v) = R - W(w, v)$.

Note that $|\overline{W}(w, v)| \leq \delta |\mathcal{R}|$ if $w \neq v$, and $\overline{W}(w, v) = \mathcal{R}$ if $w = v$. Suppose the seed PIRS uses is r. Server A returns a correct answer $w = v$, server A cannot infer anything about r. If server A returns some $w \neq v$ and gets a warning, it is possible that server A can determine $r \notin \overline{W}(w, v)$. However, even if it is assumed that server A has enough computational power to compute both the sets of witnesses and non-witnesses, it can be impossible for server A to infer which witness PIRS is using as r. After k−1 failed attacks using $w_1, \ldots, w_{k-}$, the set of seeds that server A has ruled out is $\cup_{i=1}^{k-1} \overline{W}(w_i, v_i)$, whose cardinality is at most $(k-1)\delta|R|$. Thus, $$p_k \leq \frac{\delta}{1-(k-1)\delta},$$

where $$p_k = \frac{|\text{set of non-witnesses}|}{|\text{set of remaining seeds}|} \quad (9)$$

$$= \frac{|\overline{W}(w_k, v_k)|}{|\mathcal{R} - \cup_{i=1}^{k-1} \overline{W}(w_i, v_i)|} \leq \frac{\delta}{1-(k-1)\delta}.$$

Assuming that server A has made a total of k attacks to PIRS for any k, the probability that none of them succeeds is at least $1-k\delta$.

This probability is $$Pr[e_1 = 0 \wedge \ldots \wedge e_k = 0] = \prod_{i=1}^{k}(1 - Pr[e_i = 1 | e_1 = 0, \ldots, e_{i-1} = 0]) \quad (10)$$

$$\geq \prod_{i=1}^{k}\left(1 - \frac{\delta}{1-(i-1)\delta}\right)$$

$$= \prod_{i=1}^{k} \frac{1-i\delta}{1-(i-1)\delta}$$

$$= \frac{1-\delta}{1} \cdot \frac{1-2\delta}{1-\delta} \cdots \frac{1-k\delta}{1-(k-1)\delta}$$

$$= 1 - k\delta.$$

The above shows that PIRS is very resistant towards coordinated multiple attacks, even against an adversary with unlimited computational power. For a typical value of $\delta = 2^{-32}$, PIRS could tolerate millions of attacks before the probability of success becomes noticeably less than 1. The drop in the detection rate to $1-k\delta$ occurs only if the client chooses to disclose the attacks to the server. Such disclosure is not required in many applications.

The PIRS can be extended to support sliding windows. PIRS-1 for count queries is used as an illustrative example. Those skilled in the art will recognize that the extension for sliding windows to sum queries, as well as to PIRS-2, PIRS$^\gamma$, and PIRS$^{\pm \gamma}$ can also be similarly implemented.

One property of PIRS-1 is that it is decomposable (i.e., for any $v_1, v_2, X(v_1 + v_2) = X(v_1) X(v_2)$ and for PIRS-2, $X(v_1 + v_2) = X(v_1) + X(v_2)$). This property allows PIRS to be extended for periodically sliding windows using standard techniques. One example of a sliding window query might be the following.

SELECT SUM(packet size) FROM IP_Trace
GROUP BY source_ip, destination_ip
WITHIN LAST 1 hour SLIDE EVERY 5 minutes In this example, PIRS-1 can be built for every 5-minute period, and can be kept in memory until it expires from the sliding window. Assume that there are k such periods in the window, and let $X(v_1), \ldots, X(v_k)$ be the PIRS for these periods. In addition, the data owner maintains the overall $$PIRS\ X(v) = \prod_{i=1}^{k} \chi(v_i).$$

When a new PIRS $X(v_{k+1})$ completes, $X(v)$ is updated as $X(v) := X(v) X(v_{k+1}) (X(v_1))^{-1}$. For a periodically sliding window query with k periods, the synopsis uses $$O\left(k\left(\log\frac{m}{\delta} + \log n\right)\right)$$

bits of space, spends $O(1)$ time to process an update, and $$O\left(|w|\log\frac{m}{|w|}\right)$$

time to perform a verification.

For various window sizes consisting of between 1 to k periods the k periods can be decomposed into a number of dyadic intervals. For simplicity assume that k is a power of 2. These intervals can be organized into $l = \log k$ levels. On level 0, there are k intervals each consisting of one period; on level i, $1 \leq i \leq l-1$, there are $k/2^i$ intervals, each spanning $2^i$ periods. There are a total of $2^k - 1$ such dyadic intervals for this example. One PIRS is built for each interval, so the total size of the entire synopsis is still $$O\left(k\left(\log\frac{m}{\delta} + \log n\right)\right).$$

Since a PIRS at level i+1 can be computed in constant time from two PIRS's at level i, the amortized update cost remains $O(1)$. Upon a verification request with a window size of q periods, the window can be decomposed into at most $O(\log k)$ dyadic intervals, and those corresponding PIRS's can be combined together to form the correct synopsis for the query window. To support sliding window queries with various window sizes of up to k periods, the synopsis uses $$O\left(k\left(\log\frac{m}{\delta} + \log n\right)\right)$$

bits of space, spends $O(1)$ time to process an update, and $O(\log k)$ time to assemble the required synopsis upon a verification request. The client spends $$O\left(|w|\log\frac{m}{|w|}\right)$$

time to perform a verification.

In some embodiments, a synopsis that is tolerant for a few errors, solving the $CQV^\gamma$ problem can be implemented. To achieve this, let the threshold $\gamma$ be the number of components in vector v that are allowed to be inconsistent. In some embodiments, a construction is presented that gives an exact solution that satisfies the requirements of $CQV^\gamma$, and requires $$O\left(\gamma^2 \log \frac{1}{\delta} \log n\right)$$

bits of space. This synopsis can be strengthened so that errors can be located and even corrected. This exact solution uses space quadratic in $\gamma$. In other embodiments, an approximate solution which uses only $$O\left(\gamma \log \frac{1}{\delta} (\log m + \log n)\right)$$

bits can be implemented. In other embodiments, a synopsis that can estimate the number of errors can be implemented that uses polylogarithmic space and does not depend on the threshold $\gamma$.

Figure 2:
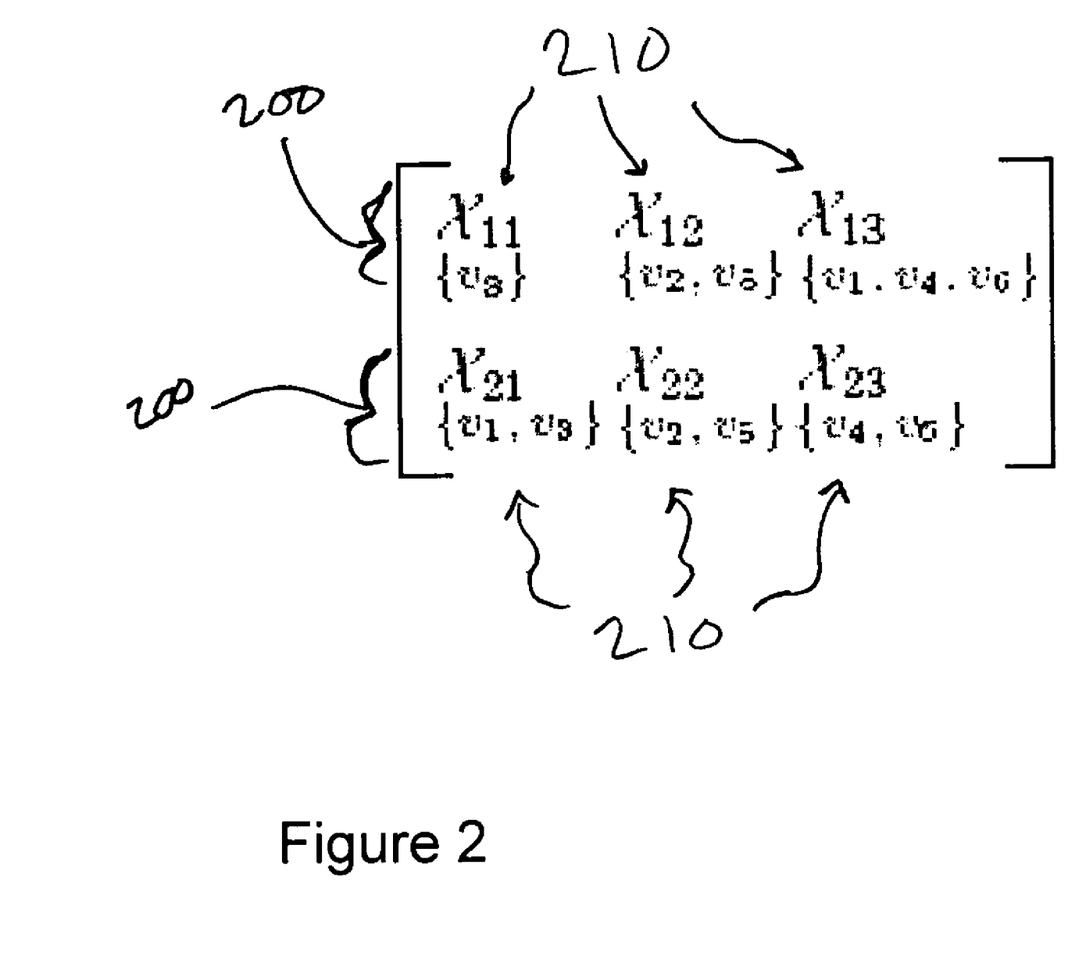
FIG. 2 is an exemplary illustration of a synopsis that includes layers and buckets.

Using PIRS as a building block, the synopsis 134 can be constructed that satisfies the requirements of $CQV^\gamma$. Referring to FIG. 2, this embodiment of the synopsis 134, referred to herein as "$PIRS^\gamma$", consists of multiple layers 200, where each layer 200 contains $k = c_1 \gamma^2$ buckets 210 ($c_1 \geq 1$ is a constant to be determined shortly). Each component of vector v is assigned to one bucket 210 per layer 200, and each bucket 210 is represented using only its PIRS synopsis. $PIRS^\gamma$ raises an alarm if at least $\gamma$ buckets in any layer raise an alarm. If there are fewer than $\gamma$ errors, no layer will raise an alarm, and if there are more than $\gamma$ errors, at least one of the layers raises an alarm with high probability (when the $\gamma$ inconsistent components do not collide on any bucket for this layer). By choosing the probability of failure of the individual PIRS synopsis carefully, it can guarantee that $PIRS^\gamma$ achieves the requirements of formal definition 2.

Examining one layer of $PIRS^\gamma$, let b be a pairwise independent hash function which maps the range $\{1, \ldots, n\}$ uniformly onto $\{1, \ldots, k\}$. $PIRS^\gamma$ assigns $v_i$ to the b(i)-th bucket, and for each bucket computes the PIRS synopsis of the assigned subset of $v_i$'s with probability of failure $\delta' = 1/(c_2 \gamma)$ where $c_2 \geq 1$ is a constant. Using PIRS-1 as an example, each of these k synopses occupies $$O\left(\log \frac{m}{\delta'} + \log n\right) = O(\log m + \log n)$$

bits. Given some $w =_\gamma v$, since there are fewer than $\gamma$ errors, no alarm is raised. Constants $c_1$ and $c_2$ can be chosen such that if $w \neq_\gamma v$, then an alarm is raised with probability at least $\frac{1}{2}$ for this layer. In this case there are two cases when the query verifier fails to raise an alarm. First where there are fewer than $\gamma$ buckets that contain erroneous components of w. Second where there are at least $\gamma$ buckets containing erroneous components but at least one of them fails due to the failure probability of PIRS. Setting constants $c_1, c_2 = 4.819$, either of the above cases occurs with probability at most $\frac{1}{4}$. In the first case, the $v_i$'s are assigned to the buckets in a pairwise independent fashion, and it can be guaranteed that the mapping of the $\gamma$ erroneous components onto the k buckets is injective with probability $$1 - \left(1 - \frac{1}{k}\right)^{\frac{\gamma(\gamma-1)}{2}} \leq 1 - \left(1 - \frac{1}{c_1 \gamma^2}\right)^{\gamma^2/2} \quad (11)$$

$$\leq 1 - 2^{-1/c_1}$$

$$\leq \frac{1}{4},$$

where the last inequality holds by the choice of $c_1$. In the second case the probability that some of the $\gamma$ buckets that are supposed to raise an alarm fail is:

$$1 - (1 - \delta')^\gamma = 1 - \left(1 - \frac{1}{c_2 \gamma}\right)^{c_2 \gamma / c_2} \quad (12)$$

$$\leq 1 - 2^{-\frac{2}{c_2}}$$

$$< \frac{1}{4},$$

which holds as long as $c_2 \geq 4.819$.

Therefore, using one layer, $PIRS^\gamma$ raises an alarm with probability at least $\frac{1}{2}$ on some $w \neq_\gamma v$, and will not raise an alarm if $w =_\gamma v$. By using $\log(1/\delta)$ layers and reporting an alarm if at least one of these layers raises an alarm, the probability is boosted to $1 - \delta$. So, for any $w \neq_\gamma v$, $PIRS^\gamma$ raises an alarm with probability at least $1 - \delta$, and for any $w =_\gamma v$, $PIRS^\gamma$ does not raise an alarm.

In addition to the $k \log(1/\delta)$ PIRS synopses, a hash function b mapping updates to buckets is generated. This is achieved by picking x and y uniformly at random from $\mathbb{Z}_p$, and computing $b(i) = xi + y \mod p \mod k$, where "mod" is used wherein for modulo. This generates a function that is pairwise-independent over the random choices of x and y. Verification can be performed by computing, in parallel, for the layers while making one pass over the answer w. Initialization, update, and verification for $PIRS^\gamma$ appear in psuedcode below.

---

Algorithm 1: $PIRS^\gamma$-INITIALIZE(Prime p, Threshold $\gamma$)

1  c = 4.819, k = $\lceil c\gamma^2 \rceil$
2  Generate x and y uniformly at random from $\mathbb{Z}_p$
3  for l = 1,...,$\lceil \log 1/\delta \rceil$ do
4  $\quad$ Layer $L_l = [X_1(v) := 0,...,X_k(v) := 0]$
$\quad$ // $X_j(v)$ is a PIRS synopsis with $\delta' = 1/c\gamma$

---

Algorithm 2: $PIRS^\gamma$-UPDATE(Tuple s = (i, u))

1  for l = 1,...,$\lceil \log 1/\delta \rceil$ do
2  $\quad$ $b_l(i)$ = xi + y mod k + 1
3  $\quad$ Update $L_l.X_{b_l(i)}(v)$ using s

---

Algorithm 3: $PIRS^\gamma$-VERIFY(Vector w)

1  for l = 1,...,$\lceil \log 1/\delta \rceil$ do
2  $\quad$ Layer $M_l = [X_1(w) := 0,...,X_k(w) := 0]$
$\quad$ // $X_j(w)$ is a PIRS synopsis with $\delta' = 1/c\gamma$
3  $\quad$ for i = 1,...,n do
4  $\quad\quad$ $b_l(i)$ = xi + y mod k + 1
5  $\quad\quad$ Update $M_l.X_{b_l(i)}(w)$ by s = (i, $w_i$)
6  $\quad$ if $|\{j \mid L_l.X_j(v) \neq M_l.X_j(w), 1 \leq j \leq k\}| \geq \gamma$
$\quad\quad$ then Raise an alarm PIRS$^\gamma$ requires $$O\left(\gamma^2 \log\frac{1}{\delta}(\log m + \log n)\right)$$

bits, spends $$O\left(\log\frac{1}{\delta}\right)$$

time to process a tuple in the stream, and $$O\left(|w|\left(\gamma + \log\frac{m}{|w|}\right)\log\frac{1}{\delta}\right)$$

time to perform a verification. Careful analysis can facilitate a smaller constant in the asymptotic cost above. For a given $\gamma$, the minimum k is chosen such that equation (11) is at most ½, and $1/\delta'$ is chosen to be very large (close to the maximum allowed integer) so that equation (12) is almost zero. For instance if $\gamma = 2$ and 3, then $2 \log 1^{\frac{1}{\delta}}$ and $6 \log\frac{1}{\delta}$ words suffice, respectively. For arbitrary $\gamma$, the storage requirement is $$2\gamma^2 \log 1^{\frac{1}{\delta}}$$

words in the worst case.

When there are a small number of errors (at most $\gamma$), PIRS$^\gamma$ does not raise an alarm, which gives some leeway to the server 110. This is often necessary so that the server can cope with large volumes of incoming data using some semantic load shedding strategies. However, in some critical applications, if the client 120 demands complete correctness, PIRS$^\gamma$ may not be sufficient, since it may only indicate to the client 120 if there are less than $\gamma$ errors, but not where they are. In some embodiments, a strengthened version of PIRS$^\gamma$, referred to herein as PIRS$^{\gamma*}$, can be implemented, that is able to identify which groups are affected by errors, and even compute the correct sums for the affected groups by taking advantage of a technique based on the binary decomposition of the group identifier.

Applying the binary decomposition to PIRS$^\gamma$, the amount of information kept about each bucket is increased. In addition to keeping a PIRS synopsis of all items which fall into a given bucket, $2\lceil\log n\rceil$ number of PIRS synopses are maintained and arranged as a two-dimensional array A of size $\lceil\log n\rceil \times 2$. When an update to group i is placed into bucket b(i), the PIRS in A[j, bit(i,j)] is updated, for all $1 \leq j \leq \lceil\log n\rceil \times 2$, where bit(i, j) denotes the jth bit in the binary representation of i.

To perform a query verification, the array A of PIRS synopses is computed for both the vector v and the answer w for each bucket. If all corresponding entries match, then (with high probability) there is no erroneous components in the bucket. If, for any j, the PIRS in both A[j, 0] and A[j, 1] do not match, then this indicates that there is more than one erroneous component in this bucket, because a single erroneous i cannot contaminate both A[j, 0] and A[j, 1]. Otherwise, there must be exactly one erroneous component falling into this bucket. This is the case for all erroneous components with high probability, providing that there are at most $\gamma$ such components. In this case, for each j, exactly one of A[j, 0] and A[j, 1] do not match. If it is A[j, 1], this indicates that the jth bit of the identifier i of the erroneous group is 1 otherwise, it is 0. Using $\lceil\log n\rceil$ pairs of PIRS, the identifier can therefore be recovered exactly.

The erroneous components $w_i$ in the answer w returned by the server 110 can be located. Moreover, enough information to recover each true $v^i$ for each wrong result can exist. For example, suppose the bucket at layer l contains exactly one error, which is $v_i$. Note that the data owner will return $X_{b_l(i)}(v)=\Pi_i(\alpha-j)^{v_j}$. Since only $v_i$ is unknown in this equation, $v_i$ can be found by solving the equation. If PIRS-2 is used, the equation becomes as $X_{b_l(i)}(v)=\Sigma_j v_j \alpha^j$. Thus, $v_i$ can be found efficiently using field subtractions and divisions.

In PIRS$^{\gamma*}$, each PIRS in PIRS$^\gamma$ is replaced with an array of O(log n) PIRS, so the space and time increases by an O(log n) factor. PIRS$^{\gamma*}$ requires $$O\left(\gamma^2 \log\frac{1}{\delta}\log n(\log m + \log n)\right)$$

bits, spends $$O\left(\log\frac{1}{\delta}\log n\right)$$

time to process a tuple in the stream, and $$O\left(|w|\left(\gamma + \log\frac{m}{|w|}\right)\log\frac{1}{\delta}\log n\right)$$

time to perform a verification. For any $w \neq_\gamma v$, PIRS$^{\gamma*}$ raises an alarm with probability $1-\delta$; for any $w =_\gamma v$, PIRS$^{\gamma*}$ does not raise an alarm but correctly identifies and recovers the errors in the answer w with probability $1-\delta$.

When the number of errors, for example $\lambda$, is no more than $\gamma$, PIRS$^{\gamma*}$ can recover all the errors with high probability. When $\lambda > \gamma$, there may be too many errors to expect a complete recovery of all the query results. Nevertheless, PIRS$^{\gamma*}$ can recover a good portion of the results. For this analysis, precision and recall are used to measure the performance of the synopsis. Precision refers to the probability that an identified error is truly an actual error. Since PIRS does not have false positives, precision is always 1. Recall, is the percentage of the actual errors that have been recovered, or equivalently, the probability that any one error has been captured by the synopsis. For any given error $\epsilon$, if the error $\epsilon$ falls into a bucket by itself in any of the layers, then PIRS$^{\gamma*}$ can correctly recover it. For a particular layer, because the errors are distributed into the buckets pairwise-independently and there are $c_1\gamma^2$ buckets, the probability that the bucket containing $\epsilon$ is the same as the bucket for any of the other $\lambda-1$ errors is at most $\lambda/(c_1\gamma^2)$ following the union bound. Since the $\log(1/\delta)$ layers are mutually independent, the probability that this collision happens in all layers is $$\left(\frac{\lambda}{c_1\gamma^2}\right)^{\log\frac{1}{\delta}} = \delta^\Omega(\log(\gamma^2/\lambda)).$$

When there are $\lambda > \gamma$ errors, PIRS$^{\gamma*}$ raises an alarm with probability $1-\delta$ and recovers the errors with a recall of $1-\delta^{\Omega(log(\gamma^2/\lambda))}$.

The exact solution is advantageous when only a small number of errors can be tolerated. In applications where $\gamma$ is large, the quadratic space requirement can be prohibitive. If alarms can be raised when approximately $\gamma$ errors have been observed, space-efficient synopsis can be implemented. This approximation is often acceptable since when $\gamma$ is large, users may not be concerned if the number of errors detected deviates from $\gamma$ by a small amount. An approximate solution, denoted with PIRS$^{\pm\gamma}$, guarantees that the PIRS$^{\pm\gamma}$ raises no alarm with probability at least $1-\delta$ on any $w=_{\gamma^-}v$ where $$\gamma^- = \left(1 - \frac{c}{\ln \gamma}\right)\gamma.$$

and raises an alarm with probability at least $1-\delta$ on any $w\neq_{\gamma^+}v$ where $$\gamma^+ = \left(1 + \frac{c}{\ln \gamma}\right)\gamma,$$

for and constant $c > -\ln \ln 2 \approx 0.367$. The multiplicative approximation ratio $$1 \pm \frac{c}{\ln \gamma}$$

is close to 1 for large $\gamma$.

PIRS$^{\pm\gamma}$ also contains multiple layers of buckets, where each bucket is assigned a subset of the components of vector v and summarized using PIRS (FIG. 2). Focusing on one layer only, one goal is, for any $w=_{\gamma^-}v$, to not raise an alarm with probability at least $\frac{1}{2}+\epsilon$ for some constant $\epsilon \in (0, \frac{1}{2})$, and on any $w\neq_{\gamma^+}v$ to raise an alarm with probability at least $\frac{1}{2}+\epsilon$. By using $$O\left(\log\frac{1}{\delta}\right)$$

independent layers and reporting the majority of the results, the probabilistic guarantee will be boosted to $1-\delta$ using Chernoff bounds described in "Randomized Algorithms", by Motwani et al., the subject matter of which is incorporated by reference in its entirety.

As an example, let k be the number of buckets per layer. The components of vector v are distributed into the k buckets in a $\gamma^+$-wise independent fashion, and for each bucket the PIRS summary of those components is computed using $\delta'=1/\gamma^2$. Given some answer w, let this layer raise an alarm only if all the k buckets report alarms. If the answer w contains more than $\gamma^+$ erroneous members, then the probability that every bucket gets at least one such component is high; and if the answer w contains fewer than $\gamma^-$ erroneous members, then the probability that there exists some bucket that is not assigned any erroneous members is also high.

One factor that determines whether a layer could possibly raise an alarm is the distribution of erroneous components into buckets. The event that all buckets raise alarms is only possible if each bucket contains at least one inconsistent component. Consider all the inconsistent components in the answer w in some order, for example $w_1, w_2, \ldots$, where of each of them can be considered a collector that randomly picks a bucket to "collect". Assume that there are enough inconsistent elements, and let the random variable Y denote the number of inconsistent components required to collect all the buckets (i.e., Y is the smallest i such that $w_1, \ldots, w_i$ have collected all the buckets). The problem becomes an instantiation of the coupon collector's problem (viewing buckets as coupons and erroneous components as trials). With k buckets, it is known that $E(Y)=k \ln k+O(k)$, therefore k is set such that $\gamma = \lceil k \ln k \rceil$. It can be seen that $k=O(\gamma/\ln \gamma)$, hence the desired storage requirement.

For any constant c', $$Pr[Y \leq k((\ln k - c')] \leq e^{-e^{c'}} + o(1), \quad (13)$$

$$Pr[Y \geq k((\ln k + c')] \leq 1 - e^{-e^{-c'}} + o(1), \quad (14)$$

where $o(1)$ depends on k.

Notice that $\ln \gamma \leq 2 \ln k$ for any $k \geq 2$, so the above equations also implies that for any real constant c:

$$Pr\left[Y \leq \gamma - c\frac{\gamma}{\ln \gamma} = \gamma^-\right] \leq e^{-e^c} + o(1), \quad (15)$$

$$Pr\left[Y \geq \gamma + c\frac{\gamma}{\ln \gamma} = \gamma^+\right] \leq 1 - e^{-e^{-c}} + o(1). \quad (16)$$

If $w=_{\gamma^-}v$, then the probability that these fewer than $\gamma^-$ independent erroneous components cover all buckets is bounded by equation (15), which is also the upper bound for the probability that the layer raises an alarm. Thus, for any $c \geq 0$, the probability of raising a false alarm is (for large enough $\gamma$) at most $$e^{-e^c} \leq 1/e. \quad (17)$$

If $w\neq_{\gamma^+}v$, then considering $\gamma^+$ of the inconsistent components, which are independently distributed to the buckets, there are two cases in which a true alarm is not raised. First, when the $\gamma^+$ components do not cover all buckets and second when all the buckets are covered but at least one of them fails to report an alarm. The probability that the first case occurs is bounded by equation (16), while the probability that the second case occurs is at most $1-(1-\delta')^k$. By the union bound, the total probability that a false negative is produced is at most $$1 - e^{-e^{-c}} + o(1) + 1 - (1-\delta')^k \leq 2 - e^{e^{-c}} - 2^{-\frac{2}{\gamma}} + o(1). \quad (18)$$

For $\gamma$ large enough, there exists a constant $\epsilon > 0$ such that this probability is at most $\frac{1}{2}-\epsilon$ for any $c > -\ln \ln 2$.

To summarize, if $c > -\ln \ln 2 \approx 0.367$, then both the false positive and false negative probabilities are at most $\frac{1}{2}-\epsilon$ for some constant $\epsilon$ at one layer with $k=O(\gamma/\log \gamma)$ buckets.

To drive down the error probabilities for both false positives and false negatives to $\delta$, $l=O(\log(1/\delta))$ layers are used and the simple majority of their "votes" is reported. This probability is quantified for false negatives; the other case is symmetric.

Each layer can be viewed as a coin flip that raises a true alarm with probability at least $\frac{1}{2}+\epsilon$. Let the random variable Z denote the number of layers that raise alarms. This process is a sequence of independent Bernoulli trials, hence Z follows the binomial distribution. For l independent layers, the expectation of Z is at least $\mu=(1/2+\epsilon)l$. By the Chernoff bound, the probability that a majority of layers raise alarms is $$Pr\left[Z<\frac{1}{2}\ell\right]=Pr\left[Z<\left(1-\frac{2\varepsilon}{1+2\varepsilon}\right)\mu\right]<e^{-\frac{\mu}{2}\left(\frac{2\varepsilon}{1+2\varepsilon}\right)^2}. \quad (19)$$

Therefore, it is ensured that $$e^{-\frac{\mu}{2}\left(\frac{2\varepsilon}{1+2\varepsilon}\right)^2}\leq\delta,$$

which can be satisfied by taking $$\ell=\left\lceil\frac{1+2\varepsilon}{\varepsilon^2}\ln\frac{1}{\delta}\right\rceil.$$

A $\gamma^+$-wise independent random hash function is generated to map groups to buckets. Using standard techniques, such a function can be generated using $O(\gamma \log n)$ truly random bits. Specifically, the technique for constructing t-universal hash families can be used. Let p be some prime between n and 2n, and $\alpha_0, \ldots, \alpha_{\gamma-1}$ be $\gamma$ random numbers chosen uniformly and independently from $\mathbb{Z}_p$. Then we set $$b(i)=\sum_{j=0}^{t-1}\alpha_j i^j \bmod k+1. \quad (20)$$

This function is guaranteed to be drawn from a t-wise independent family of functions (so that, over the random choice of the function, the probability of t items colliding under the hash function is $1/k^{t-1}$). For an incoming tuple $s=(i, u)$, $b(i)$ is computed using the $\alpha_j$'s in $O(\gamma)$ time (using Horner's rule), and then perform the update to the corresponding PIRS. This requires the storage of $O(\gamma^+)=O(\gamma)$ truly random numbers per layer. As a result, PIRS$^{\pm\gamma}$ uses $$O\left(\gamma\log\frac{1}{\delta}(\log m+\log n)\right)$$

bits of space, spends $$O\left(\gamma\log\frac{1}{\delta}\right)$$

time to process an update and $$O\left(|w|\left(\gamma+\log\frac{m}{|w|}\right)\log\frac{1}{\delta}\right)$$

time to perform a verification. By allowing two-sided errors, the size of the synopsis can be reduced from quadratic in $\gamma$ to linear.

An improved solution, FM-PIRS for the CQV$^\gamma$ problem can be generated, whose size and update cost only depend on the degree of approximation, but not $\gamma$, thus allowing it to scale well with $\gamma$. FM-PIRS directly estimates the number of errors in the result provided by the server, and then compares the estimate with $\gamma$. As a result, FM-PIRS can also support a wider range of values of $\gamma$, which can be given only at verification time. For small values of $\gamma$, the bounds and guarantees of PIRS$^\gamma$ and PIRS$^{\pm\gamma}$ are preferred, but for larger values of $\gamma$, the cost of FM-PIRS is preferable.

As the name suggest, FM-PIRS is a combination of PIRS and an FM sketch, which is described in "Probabilistic Counting Algorithms For database Applications", by Flajolet et al., the subject matter of which is incorporated herein by reference in its entirety. The FM sketch is used to estimate the number of distinct elements in a stream. The FM sketch is described as follows. Suppose that the universe is $[n]=\{1, \ldots, n\}$. A random hash function $h:[n]\to[2^L-1]$ is picked such that any $h(i)$ is uniformly distributed over $[2^L-1]$, where $L=O(\log n)$. For each element i in the stream $h(i)$ is computed. The number of trailing zeros in the binary representation of $h(i)$ are denoted by $r(i)$. The FM sketch computes $R=\max\{r(i),$ for all i in the stream$\}$ and then outputs $k/\phi\cdot 2^{(R_1+\ldots+R_k)/k}$, where $\phi\approx 0.7735$. To improve accuracy, the universe is divided into k partitions using another random uniform hash function, and an $R_j$ is computed for each partition. Finally the output is $k/\phi\cdot 2^{(R_1+\ldots+R_k)/k}$.

To illustrate the FM-PIRS synopsis, the basic FM sketch with k=1 is used although those skilled in the art will recognize that generalization to larger k is possible. Each "wrong" group i can be treated such that $v_i \neq w_i$ is a distinct element in the universe [n], and then $R=\max\{r(i),$ for all wrong groups i$\}$ can be computed. Generally, the data owner does not know whether i is a wrong group, so $r(i)$ cannot be computed directly. Instead, a number L of PIRS's $X_1, \ldots, X_L$ with $\delta'=\delta/L$ are created. For any i, group i is put into $X_j$ if $j\leq r(i)$. Thus $X_1$ gets half of the groups, $X_2$ gets a quarter of the groups, etc.

The value of R can be computed as follows. When all of $X_1, \ldots, X_L$ correctly capture the errors in them, which happens with probability at least $1-\delta'L=1-\delta$, $R=\arg\max_j\{X_j$ raises an alarm$\}$.

For k partitions, fix any k, FM-PIRS has a size of $O(k \log n(\log m+\log n))$ bits, processes a tuple in expected time $O(1)$, and computes an estimate of the number of errors in the result in expected time $O(|w|\log m|w|)$. With probability at least $1-\delta$, the estimate has a bias bounded by $1+0.31/k$ and a standard error of $0.78/\sqrt{k}$.

Since each partition keeps $L=O(\log n)$ PIRS's, the overall size of FM-PIRS is $O(k \log n(\log m+\log n))$ bits. For an incoming tuple, only one partition gets affected, but 0 to L of the PIRS's in this partition can get updated. Since the hash function h is uniform, the expected number of PIRS's updated is $O(1)$. Upon receiving the FM-PIRS synopses of vector v and an answer w from the server, we need to spend $O(\log w_i)$ expected time per non-zero entry of the answer w to compute the FM-PIRS synopses of the answer w. So the expected time needed for an estimation is $$O\left(\sum_i \log w_i\right)=O\left(|w|\log\frac{m}{|w|}\right).$$

An analytical comparison of PIRS$^{\pm\gamma}$ and FM-PIRS can be provided. Since FM-PIRS computes an estimate of the number of errors in the answer w, FM-PIRS can be used to do the same task for which PIRS$^{\pm\gamma}$ is designed. For a fair comparison, k is set such that FM-PIRS provides the same probabilistic guarantee that PIRS$^{\pm\gamma}$ does. Since the standard error of FM-PIRS is $O(1/\sqrt{k})$ and PIRS$^{\pm\gamma}$ allows a deviation of O (1/ln γ).

By setting k=O(log$^2$ γ), it can be guaranteed that FM-PIRS captures both false positives and false negatives with good probabilities (e.g., greater than ¾). Finally, by using $$O\left(\log\frac{1}{\delta}\right)$$

independent copies of FM-PIRS and taking the median, the success probability can be boosted to 1−δ, the same as what PIRS$^{\pm\gamma}$ guarantees. Finally, only L=O(log γ) are needed since estimating the number of errors when there are over, for example, 2γ of them is not required.

Under this configuration, FM-PIRS uses $$O(\log^3 \gamma (\log m + \log n)) \log \frac{1}{\delta})$$

bits of space. Thus, asymptotically (as γ grows) FM-PIRS is better than PIRS$^{\pm\gamma}$. However, for small γ PIRS$^{\pm\gamma}$ should be better in terms of size, while FM-PIRS becomes better when γ exceeds some large threshold.

Figure 3:
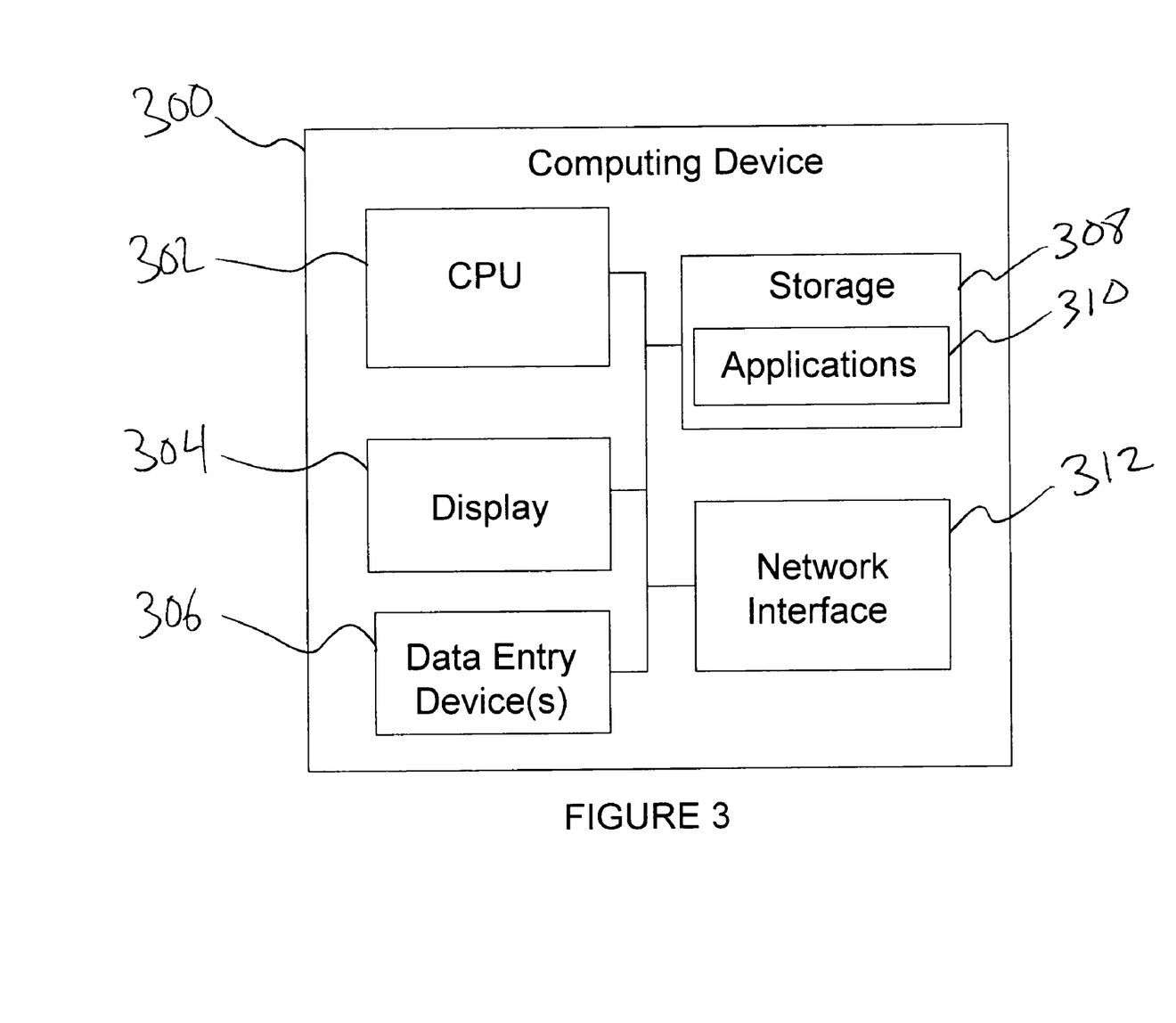
FIG. 3 is an exemplary computing device for implementing embodiments of the present invention.

FIG. 3 depicts an exemplary computing device 300 for implementing embodiments of the present invention. The computing device 300 can be a mainframe, personal computer (PC), laptop computer, workstation, handheld device, such as a PDA, or the like. The computing device 300 can be implemented as the server 110, the client 120, and/or the data owner 130. In the illustrated embodiment, the computing device 300 includes a central processing unit (CPU) 302 and preferably a display device 304. The display device 304 enables the computing device 300 to communicate directly with an operator through a visual display. The computing device 300 can further include data entry device(s) 306, such as a keyboard, touch screen, and/or mouse. The computing device 300 can include storage 308 for storing data and instructions. The storage 308 can include such technologies as a floppy drive, hard drive, tape drive, Flash drive, optical drive, read only memory (ROM), random access memory (RAM), and the like.

Applications 310 can be resident in the storage 308. The applications 310 can include instructions for implementing embodiments of the present invention. For embodiments where the computing device 300 is implemented as the data owner 130, the applications 310 can include instructions for implementing the query verifier 132. For embodiments where the computing device 300 is implemented as the untrusted server 110, the applications 310 can include instructions for implementing the DSMS 112. For embodiments where the computing device is implemented as the client 120, the applications 310 can include instructions for implementing the queries, as well as for implementing the verification of query results using the synopsis 134 generated by the data owner. The storage 308 can be local or remote to the computing device 300. The computing device 300 includes a network interface 312 for communicating with a network. The CPU 302 operates to run the application in storage 308 by performing instructions therein and storing data resulting from the performed instructions, which may be presented to an operator via the display 304 or by other mechanisms known to those skilled in the art, such a print out from a printer.

Although preferred embodiments of the present invention have been described herein with reference to the accompanying drawings, it is to be understood that the invention is not limited to those precise embodiments and that various other changes and modifications may be affected herein by one skilled in the art without departing from the scope or spirit of the invention, and that it is intended to claim all such changes and modifications that fall within the scope of the invention.

What is claimed is:

1. A computer-implemented method of verifying a query result of an untrusted server comprising:
   outsourcing, by a computing device, a data stream to the untrusted server, the untrusted server configured to respond to a query with the query result;
   generating, by the computing device, a verification synopsis based on at least a portion of the query result and a seed, the verification synopsis including a polynomial, coefficients of the polynomial being determined based on the seed;
   outputting, by the computing device, the verification synopsis and the seed to a client for verification of the query result; and
   locating and correcting errors in the query result, by the computing device, using the verification synopsis.

2. The method of claim 1, wherein a value of the seed is undisclosed by the data owner until the seed is output to the client, the seed being required by the client to use the verification synopsis.

3. The method of claim 1 further comprising raising an alarm when the verification synopsis and the query results do not match.

4. The method of claim 1 further comprising raising an alarm when the number of errors between the verification synopsis and the query results exceeds a threshold.

5. The method of claim 1 further comprising estimating the number of errors in the query result using the verification synopsis.

6. The method of claim 1 further comprising performing verification of the query result in a single pass of the query result.

7. The method of claim 1 further comprising:
   maintaining a vector corresponding to the query result; and
   computing the verification synopsis using the vector when a request for verification is received.

8. The method of claim 7 further comprising generating a plurality of layers, each having a plurality of buckets, one of the buckets being represented by the verification synopsis and elements of the vector being assigned to one bucket per layer.

9. The method of claim 7 further comprising:
   computing a result synopsis using the query result; and
   comparing the result synopsis with the verification synopsis to verify the query result.

10. The method of claim 1, wherein the verification synopsis uses at most 3 words of memory.

11. A non-transitory computer-readable medium comprising instructions, wherein execution of the instructions by at least one computing device facilitates verifying a query result of an untrusted server by:
    outsourcing a data stream to the untrusted server, the untrusted server configured to respond to a query with the query result;
    generating a verification synopsis using at least a portion of the query result and a seed, the verification synopsis including a polynomial, coefficients of the polynomial being determined based on the seed;
    outputting the verification synopsis and the seed to a client for verification of the query result; and locating and correcting errors in the query result using the verification synopsis.

12. The method non-transitory computer-readable medium of claim 11, wherein a value of the seed is undisclosed by the data owner until the seed is output to the client, the seed being required by the client to use the verification synopsis.

13. The non-transitory computer-readable medium of claim 11, wherein execution of the instructions by at least one computing device further facilitates verifying a query result of an untrusted server by:

maintaining a vector corresponding to the query result; and computing the verification synopsis using the vector when a request for verification is received.

14. The non-transitory computer-readable medium of claim 13, wherein execution of the instructions by at least one computing device further facilitates verifying a query result of an untrusted server by generating a plurality of layers, each having a plurality of buckets, one of the buckets being represented by the verification synopsis and elements of the vector being assigned to one bucket per layer.

15. The non-transitory computer-readable medium of claim 13, wherein execution of the instructions by at least one computing device further facilitates verifying a query result of an untrusted server by:

computing a result synopsis using the query result; and comparing the result synopsis with the verification synopsis to verify the query result.

16. A system for verifying a query result of an untrusted server comprising:

a computing device associated with a data owner configured to generate a verification synopsis using a vector associated with query results from the untrusted server, the verification synopsis including a polynomial and a seed, the computing device associated with the data owner being configured to output the verification synopsis and the seed to a computing device associated with a client being configured to verify an answer to a query using the verification synopsis, the computing device associated with the client being configured to locate and correct errors in the query result using the verification synopsis.

17. The system of claim 16, wherein the seed is undisclosed by the data owner until the seed is output to the client, the seed being required by the client to use the verification synopsis.

18. The system of claim 16, wherein the computing device associated with the data owner is configured to compute the verification synopsis when a request for verification is received from the client.

19. The system of claim 16, wherein the computing device associated with the data owner is configured to generate a layered verification synopsis, the layered verification synopsis including a plurality of layers, each having a plurality of buckets, one of the buckets being represented by the verification synopsis and elements of the vector being assigned to one bucket per layer.

* * * * *